(12) United States Patent
Nishimura et al.

(10) Patent No.: US 6,431,140 B1
(45) Date of Patent: Aug. 13, 2002

(54) INTAKE PORT SHAPE OF INTERNAL COMBUSTION ENGINE

(75) Inventors: Akihiro Nishimura; Hiroshi Omote, both of Osaka (JP)

(73) Assignee: Yanmar Diesel Engine Co., Ltd., Osaka (JP)

( * ) Notice: Subject to any disclaimer, the term of this patent is extended or adjusted under 35 U.S.C. 154(b) by 0 days.

(21) Appl. No.: 09/719,110

(22) PCT Filed: May 11, 1999

(86) PCT No.: PCT/JP99/02413
§ 371 (c)(1),
(2), (4) Date: Feb. 22, 2001

(87) PCT Pub. No.: WO99/64733
PCT Pub. Date: Dec. 16, 1999

(30) Foreign Application Priority Data

Jun. 9, 1998 (JP) ............................................ 10-160486
Oct. 23, 1998 (JP) ............................................ 10-302110

(51) Int. Cl.[7] ................................................ F02B 31/04
(52) U.S. Cl. ................ 123/306; 123/188.14; 123/188.8
(58) Field of Search ......................... 123/188.8, 188.14, 123/306, 308

(56) References Cited

U.S. PATENT DOCUMENTS

| | | | | |
|---|---|---|---|---|
| 2,921,571 A | * | 1/1960 | Vogel et al. | 123/188.14 |
| 3,045,655 A | * | 7/1962 | Formia | 123/188.14 |
| 4,302,935 A | | 12/1981 | Cousimano | 60/272 |
| 4,389,988 A | * | 6/1983 | Ong | 123/188.14 |
| 4,438,740 A | | 3/1984 | Slee | 123/188.8 |
| 5,255,649 A | | 10/1993 | Isaka | 123/308 |
| 5,605,123 A | * | 2/1997 | Ohmura et al. | 123/188.14 |
| 5,836,284 A | * | 11/1998 | Oda et al. | 123/188.14 |

FOREIGN PATENT DOCUMENTS

| | | |
|---|---|---|
| DE | 1292939 | 4/1969 |
| EP | 0281015 | 9/1988 |
| JP | 3164523 | 7/1991 |

* cited by examiner

Primary Examiner—Willis R. Wolfe
(74) Attorney, Agent, or Firm—Crowell & Moring LLP

(57) ABSTRACT

An object of the present invention is to restrict a part of intake flow which is apt to flow in a direction opposite to a counter swirl flow after colliding against a valve stem, and to produce an intense swirl while controlling a worsening of flow coefficient. A valve seat supporting annular stepped surface(14) is formed on an intake port outlet portion of a cylinder head (1), its inner peripheral edge is formed into a shape having an inner peripheral edge (4a) of a valve stem (4)for serving as a base circle, and a extending portion (15) projecting toward a side of a valve stem (11) is provided on a radial intake port inlet side portion. The extending portion (15) is formed into a mountain-like shape which widens from a top portion projecting toward the valve stem side to both peripheral sides and connects to the base circle at its foot ends; or into an arc-like shape; or into a trapezoidal shape. A back wall (16) is formed on a side opposite to the valve seat of the extending portion (15), the back wall decreasing its projecting height toward an upstream side in the intake port to smoothly connect to an inner peripheral wall surface of the intake port 2.

23 Claims, 7 Drawing Sheets

INTAKE PORT SHAPE OF INTERNAL COMBUSTION ENGINE

TECHNICAL FIELD

This invention relates to an intake port shape of internal combustion engine, and particularly to an intake port shape of internal combustion engine which produces a swirl by using a direct port.

BACKGROUND ART

In the internal combustion engine of such a type, various technologies and studies have been made to improve an intensity of swirl flow by controlling a direction of intake flow in an intake port or at an outlet of the intake port, and there are a shroud valve method, a masked plate method and a stepped port method etc.

The shroud valve method has a structure in which a shroud for direction control is formed on an intake valve, the masked plate method has a structure in which an annular masked plate provided with an inward extending surface is installed between a valve seal and a seat fitting annular stepped surface as showed in Published Patent Application (KOKAI) No. 63-131824, and the stepped port method has a structure in which an inward extending inclined wall is formed on an inner peripheral wall of intake port as showed in Published Patent Application (KOKAI) No. 8-189366.

DISCLOSURE OF INVENTION (Technical Problem to be Solved by the Invention)

In the shroud valve method, it is required to equip a locking mechanism to the intake valve in order to secure a position of the shroud. Therefore, a structure becomes complicated to cause a cost increase, and one-sided wear is apt to occur on the intake valve due to locking and thermal deformation of the valve, so that this method includes a problem of durability. In addition, a flow coefficient is also worsened because a flow sectional area is practically reduced by the shroud.

In the masked plate method, a flow sectional area of the intake port is abruptly reduced so that the flow coefficient is worsened. Also, its plate member will cause a problem of durability.

In the stepped port method showed in Published Patent Application (KOKAI) No. 8-189366, a crescent extending portion is formed on a seat fitting stepped surface. In such a shape of flow restriction type, the flow sectional area of intake is remarkably reduced to cause a worsening of flow coefficient due to an excessive increase in a extending amount of arc-shaped inner peripheral edge of the extending portion in order to efficiently restrict a valve stem collision flow which is a maximum counter swirl flow.

(Object of the Invention)

An object of the present invention is to restrict a part of intake flow which is apt to flow in a direction opposite to a swirl flow after colliding with a valve stem, and to produce an intense swirl flow while controlling a worsening of flow coefficient. To prevent the one-sided wear and to improve the durability are also objects of the present invention.

(Solution for the Problem)

An invention as claimed in Claim 1 of the present invention is characterized by that, in an intake port shape of internal combustion engine wherein an annular stepped surface 14 for supporting a valve seat is formed on an intake port outlet portion of a cylinder head 1, and an end face of a valve seat 4 is made contact with the annular stepped surface 14 to support it, a shape of an inner peripheral edge of the annular stepped surface 14 includes a shape of an inner peripheral edge 4a of the valve seat 4 as its base circle, and has an extending portion 15 projecting toward a valve stem 11 side at a radial inlet side portion of an intake port, and the extending portion 15 is formed into a mountain-like shape which widens from a top portion 15a projecting toward the valve stem side to both peripheral sides with moderate inclinations, and finally connects to the base circle at both foot ends, and a ridge-like back wall 16 is formed at a side opposite to a valve seat side of the extending portion 15, the back wall decreasing its projecting height toward an upstream side along an intake port 2 and connecting smoothly to an inner peripheral wall surface of the intake port 2.

An invention as claimed in Claim 2 of the present invention is characterized by that, in an intake port shape of internal combustion engine wherein an annular stepped surface 14 for supporting a valve seat is formed on an intake port outlet portion of a cylinder head 1, and an end face of a valve seat 4 is made contact with the annular stepped surface 14 to support it, a shape of an inner peripheral edge of the annular stepped surface 14 includes a shape of an inner peripheral edge 4a of the valve seat 4 as its base circle, and has a extending portion 15 projecting toward a valve stem 11 side at a radial inlet side portion of an intake port, the extending portion 15 is formed into a trapezoidal shape which has a flat top portion 15a projecting toward the valve stem side, widens from the flat top portion 15a to both peripheral sides with moderate inclinations, and finally connects to the base circle at both foot ends, and a ridge-like back wall 16 is formed at a side opposite to a valve seat side of the extending portion 15, the back wall decreasing its projecting height toward an upstream side along an intake port 2 and connecting smoothly to an inner peripheral wall surface of the intake port 2.

An invention as claimed in Claim 3 of the present invention is characterized by that, in an intake port shape of internal combustion engine wherein an annular stepped surface 14 for supporting a valve seat is formed on an intake port outlet portion of a cylinder head 1, and an end face of a valve seat 4 is made contact with the annular stepped surface 14 to support it, a shape of an inner peripheral edge of the annular stepped surface 14 includes a shape of an inner peripheral edge 4a of the valve seat 4 as its base circle, and has a extending portion 15 projecting toward a valve stem 11 side at a radial inlet side portion of an intake port, the extending portion 15 is formed into an arc-like shape with respect to the base circle, and a back wall 16 is formed at a side opposite to a valve seat side of the extending portion 15, the back wall decreasing its projecting height toward an upstream side along an intake port 2 and connecting smoothly to an inner peripheral wall surface of the intake port 2.

An invention as claimed in Claim 4 of the present invention is characterized by that, in an intake port shape of internal combustion engine as claimed in claim 2 or 3, a partially circular concave portion is formed on the top portion 15a with a specified distance kept from the valve stem 11.

An invention as claimed in Claim 5 of the present invention is characterized by that, in an intake port shape of internal combustion engine as claimed in claim 2 or 3, a mountain-like top portion projecting toward the valve stem side is formed at the trapezoidal or arc-like extending portion.

An invention as claimed in Claim 6 of the present invention is characterized by that, in the intake port shape of internal combustion engine as claimed in any one of claim 1 to claim 5, a rounded valve seat is installed for serving as the valve seat.

(Effect Superior to Prior Art)
(1) Conventionally, a part of intake flow has been made collide against the valve stem or valve head to produce counter swirl flow. In the present invention, this part of intake flow is made uniform and divided to both sides of the valve stem by the back wall 16 to avoid collision against the valve stem in a flow course from midway of the intake port 2 to the extending portion 15 of the valve seat fitting annular stepped portion 14, and the intake flow in a direction of counter swirl is restricted by reducing an upstream side space in a radial direction of the valve stem 11 through means of the top portion 15a extending to the valve stem side. Thus, the swirl flow can be intensified.
(2) Since it is not required to lock the intake valve as in case of the conventional shroud method, the one-sided wear of the intake valve due to thermal deformation etc. can be prevented and the durability of valve can be maintained. Further, there is no possibility of wrong assembling of the intake valve and deviation of stem axis.
(3) The flow sectional area is changed by forming the back wall 16 followed by the extending portion 15 at the upstream side of the annular stepped surface 14. Consequently, the intake flow is made uniform from the upstream side within the intake port, so that a pressure loss can be reduced, as compared with the conventional shroud valve method and the mask plate method.
(4) In the invention as claimed in Claim 1, the extending portion 15 is formed into the mountain-like shape which extends from the top portion 15a projecting toward the valve stem side, to both peripheral sides with moderate inclinations, so that a percentage of a masked area in the vicinity of the valve stem 11 becomes large. Therefore, while effectively restricting the intake flow which is apt to flow in the direction opposite to the counter swirl flow after colliding against the valve stem 11, a decrease in the flow sectional area can be minimized and a lowering of the flow coefficient can be prevented.
(5) In the invention as claimed in Claim 2 or 3, since at least the top portion of the extending portion is made flat, a cast molding becomes easy.
(6) In the invention as claimed in Claim 4 or 5, since the extending portion has the shape of combination of the mountain-like shape with the arc-like or trapezoidal shape, the sectional area of extending portion can be increased and the swirl flow can be intensified further while controlling the lowering of the flow coefficient, as compared with the mountain-like shape alone, the trapezoidal shape alone, or the arc-like alone.
(7) When a rounded valve seat 24 is installed for serving as the valve seat as described in the invention as claimed in Claim 6, a peeling-off of intake flow is reduced at a border between the bottom of a seat surface 23 and a lower rounded surface 21. This effect is remarkable at a part where no extending portions existing, and a counter swirl flow is relatively reduced. Thereby, the swirl flow is further intensified.

BEST MODE FOR CARRYING OUR THE INVENTION (First Embodiment According to the Invention Claimed in Claim 1)

Figure 1:
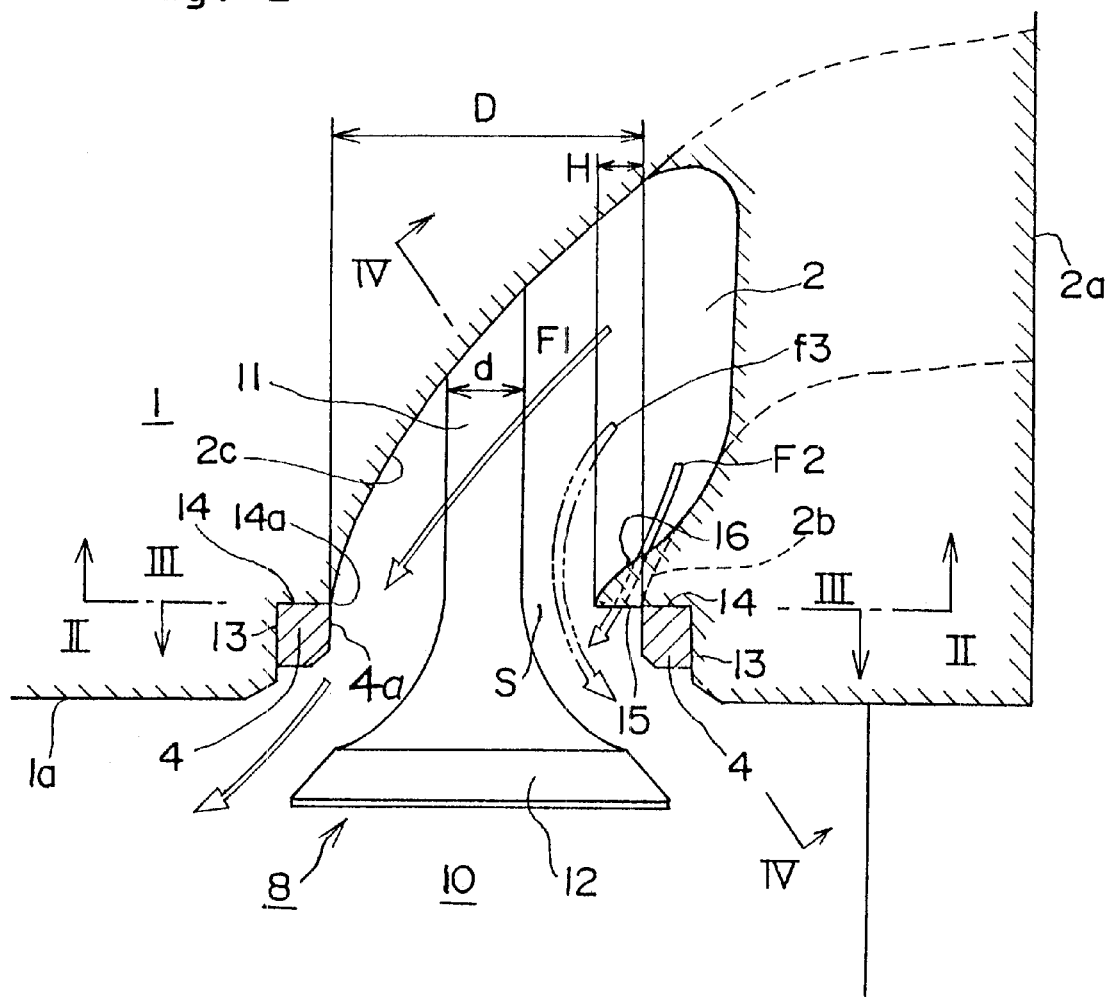
FIG. 1 is a vertical sectional view of a cylinder head of the internal combustion engine according to Claim 1 of the present invention.

FIG. 1 to FIG. 4 are the embodiment according to the invention as claimed in Claim 1 of the present invention. In FIG. 1 showing the vertical sectional view of the cylinder head 1, the direct type intake port 2 connects at its inlet end to a not-shown intake manifold open to a side face of the cylinder head 1, and passes through around the valve stem 11 and a valve head 12 of an intake valve 8 to a combustion chamber 10. The annular stepped portion 14 and an expanded bore 13 for fitting the valve seat 4 are formed at an outlet end of the intake port 2, and the valve seat 4 is fitted in the expanded bore 13 and made contact with the annular stepped portion 14 to be supported by it.

An inner peripheral edge 14a of the annular stepped surface 14 is formed on the basis of a base circle having the same inner diameter D as that of the valve seat 4, and has the extending portion 15 projecting toward the valve seat 11 side at a radial upstream side (right side of FIG. 1). At upstream side in a direction of intake flow of the extending portion 15 (right-upper side of FIG. 1), a ridge-like back wall 16 is formed, which decreases its projecting amount from an intake port inner peripheral wall surface 2b toward the upstream side and connects smoothly to the intake port inner peripheral wall surface 2b.

Figure 2:
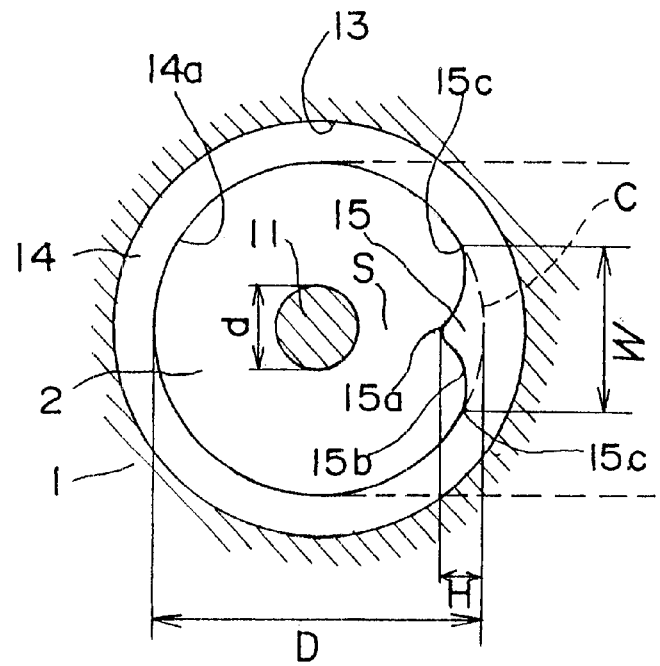
FIG. 2 is a sectional view taken on a line II—II of FIG. 1.

FIG. 2 is the enlarged sectional view taken on the line II—II of FIG. 1. The extending portion 15 is formed into a mountain-like shape having large feet on both sides, which comprises a top portion 15a projecting most toward the valve stem side and inclining portions 15b widening from the top portion 15a to both peripheral sides with moderate inclinations. Both foot ends 15c connect to the inner peripheral edge 14a on the base circle without being rounded in particular.

As for sizes of the extending portion 15, its width W is preferably about 1 to 2 times as large as a valve stem diameter d, and a projecting amount (height) H of the top portion 15a is preferably about 10 to 30% of a valve seat inner diameter (base circle diameter) D. The above-mentioned range is most suitable for the mountain-like extending portion to control the reduction in flow sectional area of the intake port and to effectively prevent the worsening of flow coefficient. Incidentally, the embodiment shows a case where the width W is approximately twice as large as the valve stem diameter d and the projecting amount (height) H of the top portion 15a is approximately 16% of the valve seat inner diameter D.

Figure 4:
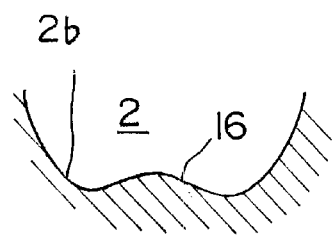
FIG. 4 is a sectional view taken on a line IV—IV of FIG. 1.

FIG. 4 is the enlarged sectional view taken on the line IV—IV of FIG. 1. It can be clearly understood from this figure that a sectional shape of the back wall 16 is also formed into the mountain-like shape having moderate inclinations corresponding to the above-mentioned extending portion 15.

Figure 3:
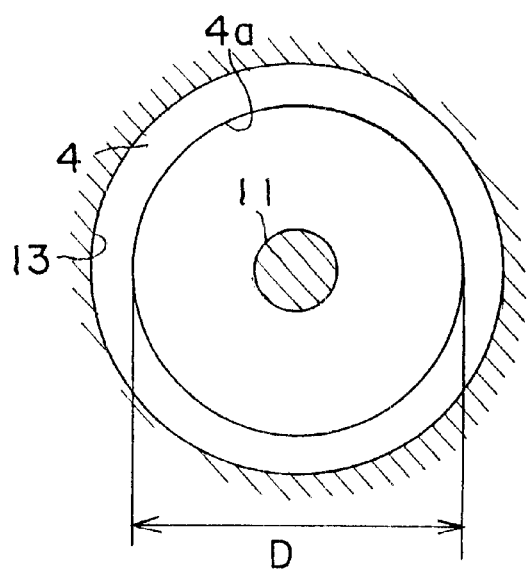
FIG. 3 is a sectional view taken on a line III—III of FIG. 1.

FIG. 3 is the enlarged sectional view taken on the line III—III of FIG. 1. This figure clearly shows a shape of the valve seat 4.

In FIG. 1, a main current of intake flow supplied from an intake manifold into the intake port 2 flows along a radial downstream side intake port inner peripheral wall surface 2c as shown by an arrow F1, for example, and is supplied into the combustion chamber 10 to become a swirl flow. At an upstream side (inner peripheral wall surface 2b side) in the intake port 2, the intake which will conventionally collide against the valve stem 11 and flow in the direction opposite to the swirl direction as shown by an imaginary arrow f3, is made uniform and divided to radial both sides of the valve stem 11 as shown by an arrow F2 by the ridge-like back wall 16 extending from midway of the intake port 2 to the extending portion 15. Then, the intake flows in the direction of swirl similar to the main current F1, and is supplied to the combustion chamber 10. In addition, the space S at radial upstream side of the valve stem 11 is made narrow by the top portion 15a projecting toward the valve stem side and the intake flow in the direction-opposite to the swirl is restricted, so that the swirl flow can be intensified further.

(Second Embodiment According to the Invention Claimed in Claim 2)

Figure 6:
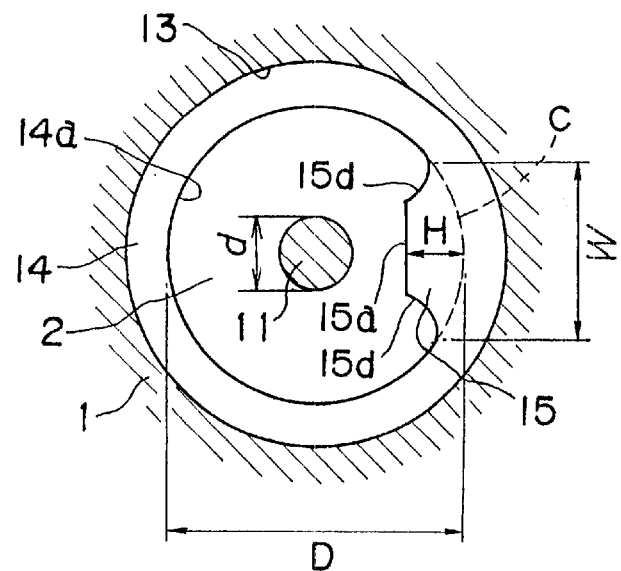
FIG. 6 is a sectional view of a part same with FIG. 2 according to Claim 2 of the present invention.

FIG. 6 shows the embodiment according to the invention as claimed in Claim 2 of the present invention, and is the sectional view (corresponding to the view taken on the line II—II of FIG. 1) of the same part of FIG. 2. In FIG. 6, the extending portion 15 put at the end of the radial intake port inlet side (right side of FIG. 6) is formed into a trapezoidal shape wherein the top portion 15a is formed into a flat shape and its both sides are provided with widened inclining portions 15d. A projecting amount H of the top portion 15a is about 10 to 30% of the valve seat inner diameter D with respect to the base circle C, and its width W is about one to four times as large as the valve stem diameter d. At the upstream side of the extending portion 15 in the direction intake flow, the back wall 16 is formed in the same way as explained in FIG. 1, which decreases its projecting amount from the intake port inner peripheral wall surface 2b toward the upstream side and connects smoothly to the intake port inner peripheral wall surface. Structures other than the extending portion 15 and the back wall 16 are the same as those of the embodiment described in FIG. 1 to FIG. 4, same components are attached with same symbols, and duplicate descriptions are neglected.

(Third Embodiment According to the Invention Claimed in Claim 3)

Figure 7:
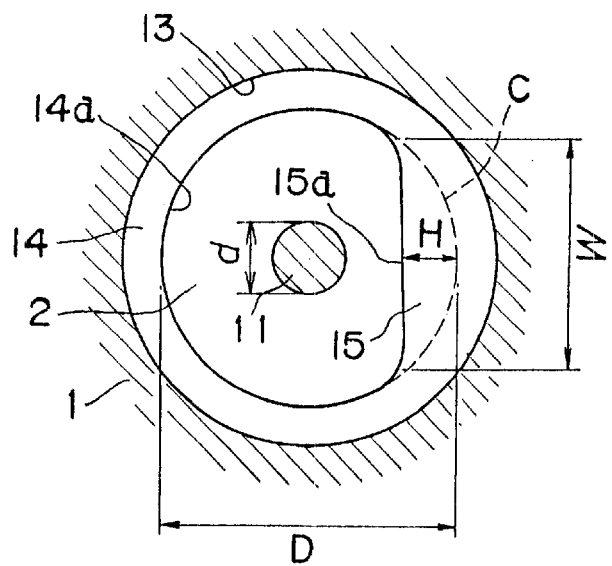
FIG. 7 is a sectional view of a part same with FIG. 2 according to Claim 3 of the present invention.

FIG. 7 shows the embodiment according to the invention as claimed in Claim 3 of the present invention, and is the sectional view (corresponding to the view taken on the line II—II of FIG. 1) of the same part of FIG. 2. In FIG. 7, the extending portion 15 put at the end of the radial intake port inlet side is formed into the arc-like shape with respect to the base circle C and connects to the base circle at its both ends.

As for sizes of the extending portion 15, a projecting amount H of the top portion 15a is about 10 to 30% of the valve seat inner diameter D with respect to the base circle C, and a width W is about one to four times as large as the valve stem diameter d. At the upstream side of the extending portion 15 in the direction intake flow, the back wall 16 is formed in the same way as explained in FIG. 1, which decreases its projecting amount from the intake port inner peripheral wall surface 2b toward the upstream side and smoothly connects to the intake port inner peripheral wall surface. Structures other than the extending portion 15 and the back wall 16 are the same as those of the embodiment described in FIG. 1 to FIG. 4, same components are attached with same symbols, and duplicate descriptions are neglected.

(Comparison of Characteristics Between First to Third Embodiments with Prior Art)

Figure 8:
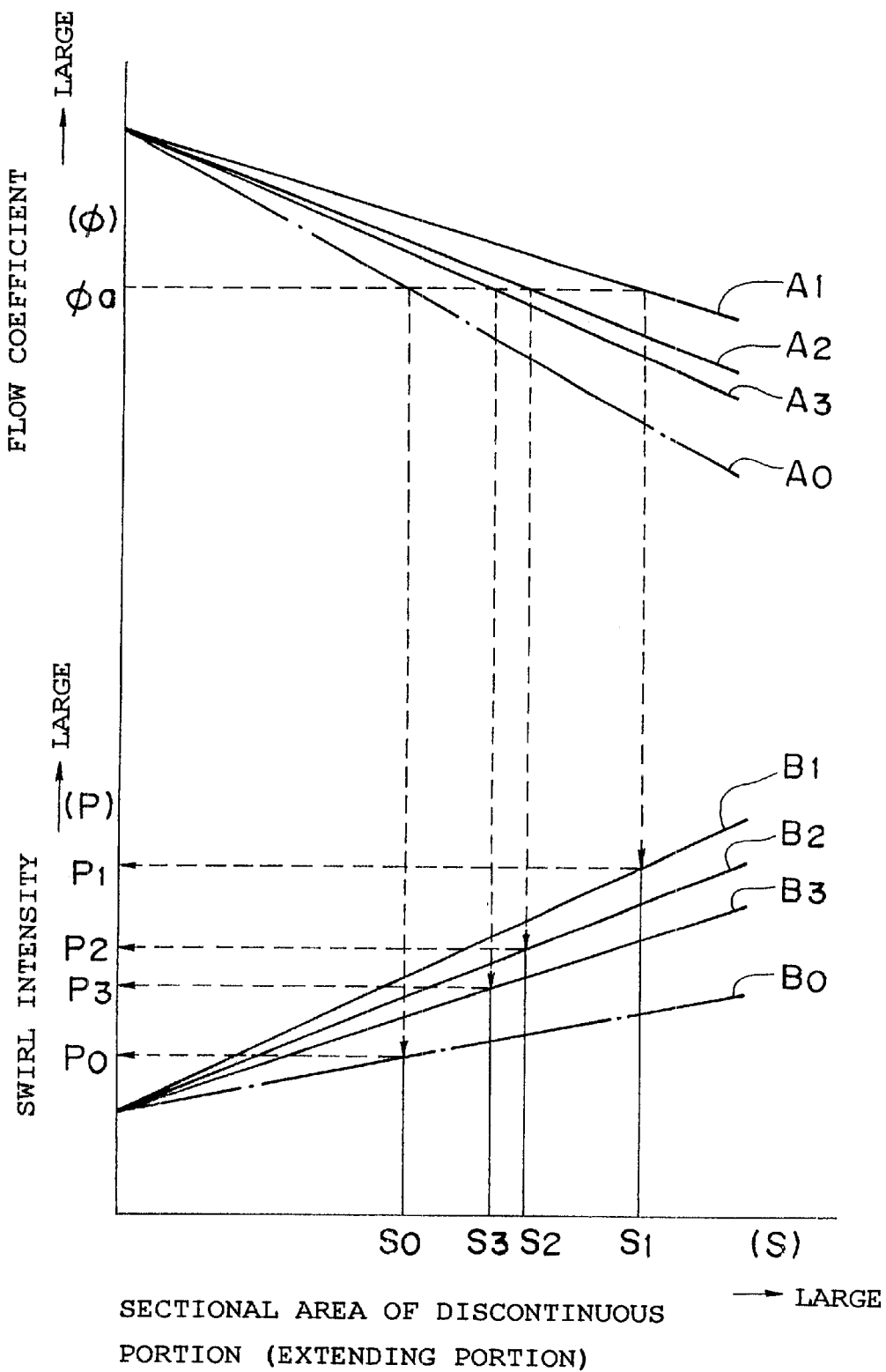
FIG. 8 is a characteristic diagram comparing characteristics of embodiments of FIG. 2, FIGS. 6 and FIG. 7 with that of prior art.

In FIG. 8, a lower part of the axis of ordinate represents a swirl intensity P, an upper part of it represents a flow coefficient $\phi$, and the axis of abscissa represents a sectional area S of discontinuous portion (extending portion 15). Upper straight lines A1 to A3 and A0 indicate relation between the flow coefficient $\phi$ and the discontinuous portion sectional area S with respect to the extending portion of first to third embodiments and the conventional crescent shape. Lower straight lines B1 to B3 and B0 indicate relation between the swirl intensity P and the discontinuous portion sectional area S with respect to the extending portion of first to third embodiments and the conventional crescent shape.

Namely, the straight lines A1 and B1 indicate characteristics obtained when the extending portion 15 is formed into the mountain-like shape as illustrated by FIG. 2 (first embodiment), and the straight lines A2 and B2 indicate characteristics obtained when the extending portion 15 is formed into the trapezoidal shape as illustrated by FIG. 6 (second embodiment). Further, the straight lines A3 and B3 indicate characteristics obtained when the extending portion 15 is formed into the arc-like shape as illustrated by FIG. 7 (third embodiment), and the straight lines A0 and B0 shown by one-dot chain lines indicate characteristics obtained when the extending portion 15 is formed into the crescent shape as in case of the conventional embodiment (Published Patent Application (KOKAI) No. 8-189366).

As indicated by straight lines A1 to A3 and A0, the flow coefficient $\phi$ and the discontinuous sectional area S basically exhibit such a relationship that the flow coefficient $\phi$ decreases with an increase in the discontinuous sectional area S. However, a rate of decrease (inclination) in the flow coefficient $\phi$ differs depending on the shape of extending portion, particularly on a percentage difference of area in the vicinity of the valve stem. The rate of decrease is largest in case of the conventional crescent shape (straight line A0), and smallest in case of the mountain-like shape of the first invention (straight line A1). The rates of decrease in the trapezoidal shape and the arc-like shape (straight lines A2 and A3) are larger than that of the embodiment 1 but they are smaller than that of the conventional crescent shape.

Consequently, when the discontinuous sectional areas S1 to S3 and S0 are compared each other at a constant value of the flow coefficient $\phi$, the sectional areas S1, S2 and S3 of the first to third embodiments of the present invention (straight lines A1 to A3) can be set larger than the sectional area S0 of the prior art, and can be put in such an order as S1>S2>S3. In other words, while keeping the flow coefficient $\phi$ at a constant value, the sectional area can be made maximum by the use of the extending portion having the mountain-like shape, followed by that having the trapezoidal shape and that having the arc-like shape. In the prior art, it is inevitable that the sectional area of the extending portion should be made minimum. On the other hand, if the sectional areas of the extending portion are defined to the same S1, the flow coefficient becomes the minimum in the conventional crescent shape (straight line A0), and it becomes large in an order of third embodiment, second embodiment and first embodiment.

As indicated by the straight lines B1 to B3 and B0, the swirl intensity P and the discontinuous sectional area S fundamentally exhibit such a relationship that the swirl intensity P increases with an increase in the discontinuous sectional area S. However, a rate of increase (inclination) in the swirl intensity P differs depending on the shape of extending portion, particularly on a percentage difference of area in the vicinity of the valve stem. The rate of increase is smallest in case of the conventional crescent shape (straight line B0), and largest in case of the mountain-like shape of the first invention (straight line B1). The rates of increase in the trapezoidal shape and the arc-like shape (straight lines B2 and B3) are smaller than that of the embodiment 1 but they are larger than that of the conventional crescent shape.

Consequently, if the sectional areas S1 of the extending portion are defined to the same S1, the swirl intensity P becomes the minimum in the conventional crescent shape (straight line B0), and the swirl intensity P becomes large in an order of third embodiment, second embodiment and first embodiment (B3, B2 and B).

The flow coefficient $\phi$ will be compared with the swirl intensity P through means of the discontinuous sectional area S hereunder. When the coefficient is kept at a constant value ($\phi$a), the swirl intensity becomes P1, P2 and P3 respectively as conducted by respective arrows of broken line through the straight lines A1 to A3 and B1 to B3, in case of the first and second and third embodiments. While, the swirl intensity becomes P0 as conducted by the arrows of broken line through the straight lines A0 and B0, in case of the conventional crescent shape. As obvious from the figure, the swirl intensity has such a relationship as P1>P2>P3>P0.

Namely, according to the first to third embodiments, a large discontinuous sectional area can be secured and a swirl more intense than that of the prior art can be produced, without reducing the flow coefficient.

(Fourth Embodiment According to the Invention Claimed in Claim 4)

Figure 9:
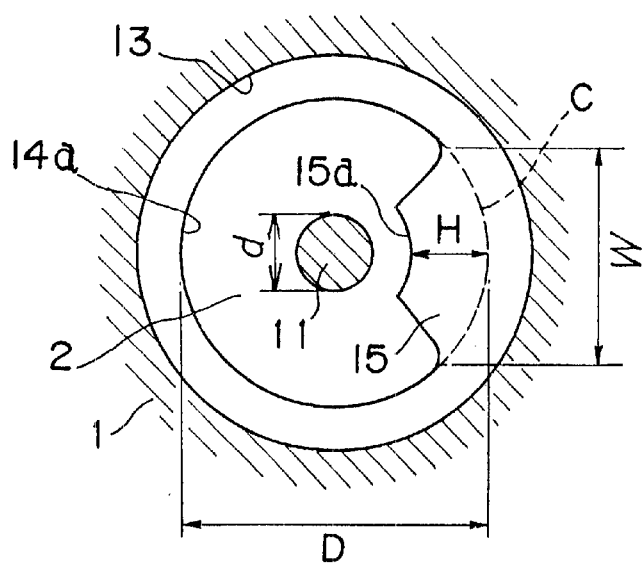
FIG. 9 is a sectional view of a part same with FIG. 2 according to Claim 4 of the present invention.
Figure 10:
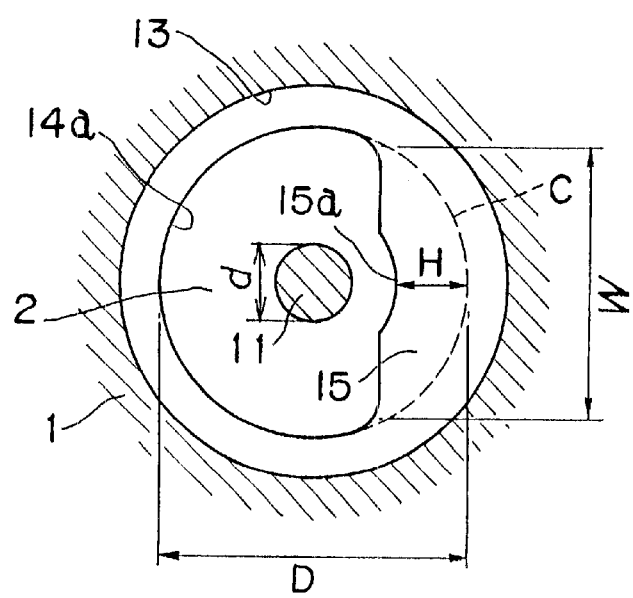
FIG. 10 is a sectional view of a part same with FIG. 2 according to Claim 4 of the present invention.

FIG. 9 and FIG. 10 show the embodiments according to the invention as claimed in Claim 4 of the present invention, and are the sectional views of the same part as that of FIG. 2 (corresponding to sectional view taken on the line II—II of FIG. 1). The extending portion 15 of FIG. 9 can be said as an alternate of the trapezoidal extending portion of FIG. 6, and a partially circular concave portion apart from the valve stem with a specified distance left between them is formed on the top portion 15a of the extending portion 15. The extending portion 15 of FIG. 10 can be said as an alternate of the arc-like extending portion of FIG. 7, and a partially circular concave portion apart from the valve stem with a specified distance left between them is formed on the top portion (central portion) 15a of the arc-like extending portion 15. As for sizes of the extending portion 15, a projecting amount H of the top portion 15a with respect to the base circle C is about 10 to 30% of the valve seat inner diameter D, and a width W is about one to four times as large as that of the valve stem diameter d.

Both extending portions 15 of FIG. 9 and FIG. 10 are extended toward the valve stem side more than those of FIG. 6 and FIG. 7 so as to increase the sectional areas. While, in order to avoid the decrease in flow coefficient due to the increase in sectional area, the partially circular concave portions are formed at top portions to minimize the collision amount of intake against the valve stem 11 and effectively restrict the intake which will become the counter swirl flow. Therefore, the extending portions 15 of FIG. 9 and FIG. 10 can improve the swirl intensity more than those of the trapezoidal and arc-like shapes alone shown in FIG. 6 and FIG. 7.

(Fifth Embodiment According to the Invention Claimed in Claim 5)

Figure 11:
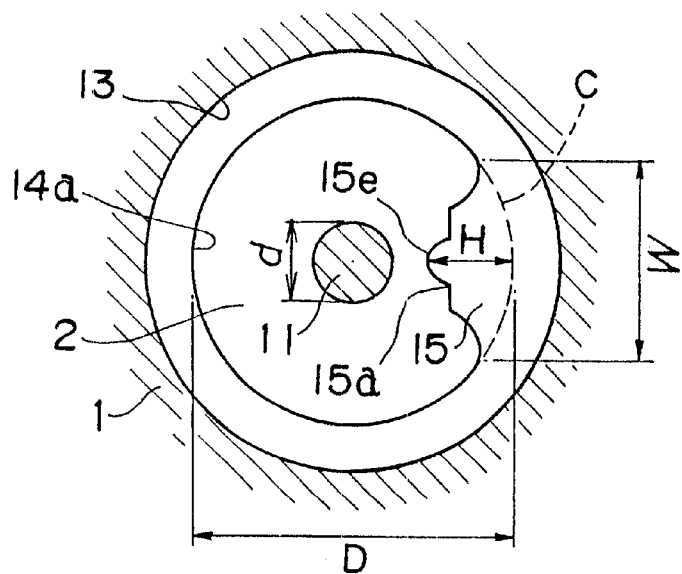
FIG. 11 is a sectional view of a part same with FIG. 2 according to Claim 5 of the present invention.
Figure 12:
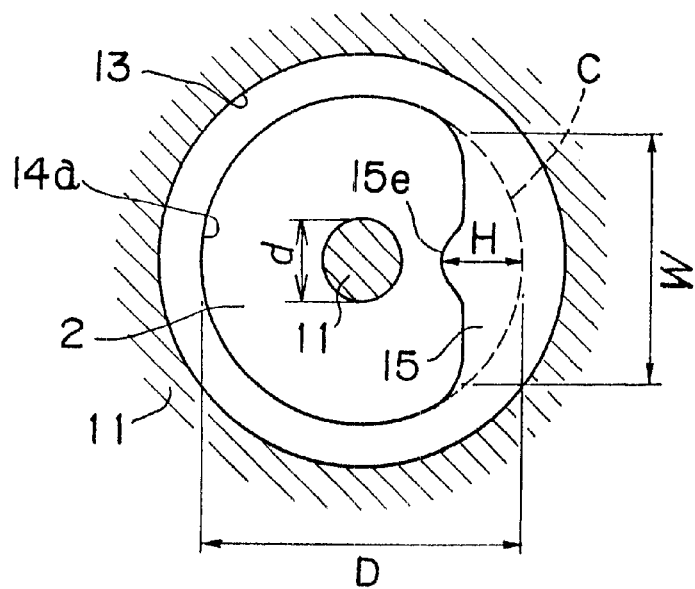
FIG. 12 is a sectional view of a part same with FIG. 2 according to Claim 5 of the present invention.

FIG. 11 and FIG. 12 show the embodiments according to the invention as claimed in Claim 5 of the present invention, and are the sectional views of the same part as that of FIG. 2 (corresponding to sectional view taken on the line II—II of FIG. 1). The extending portion 15 of FIG. 11 can be said as an alternate of the trapezoidal extending portion of FIG. 6, and a mountain-like top 15e portion further projecting toward the valve stem is formed on the flat top portion 15a. The extending portion 15 of FIG. 12 can be said as an alternate of the arc-like extending portion of FIG. 7, and a mountain-like top portion 15e further projecting toward the valve stem is formed on the top portion (central portion) of the extending portion 15. In conclusion, it can be said that these fifth embodiments have shapes formed by combining the mountain-like extending portion of FIG. 2 with the trapezoidal shape of FIG. 6 or the arc-like shape of FIG. 7. As for sizes of the extending portion 15, a projecting amount H of the top portion 15a with respect to the base circle C is about 10 to 30% of the valve seat inner diameter D, and a width W is about one to four times as large as that of the valve stem diameter d.

Therefore, when both sides of the extending portion of FIG. 2, i.e. portions apart from the valve stem 11, are formed into the arc-like shape or the trapezoidal shape in both the extending portions 15 of FIG. 11 and FIG. 12, the discontinuous sectional area is increased and the swirl intensity is improved while controlling the decrease in the flow coefficient.

(Other Embodiments)

Figure 5:
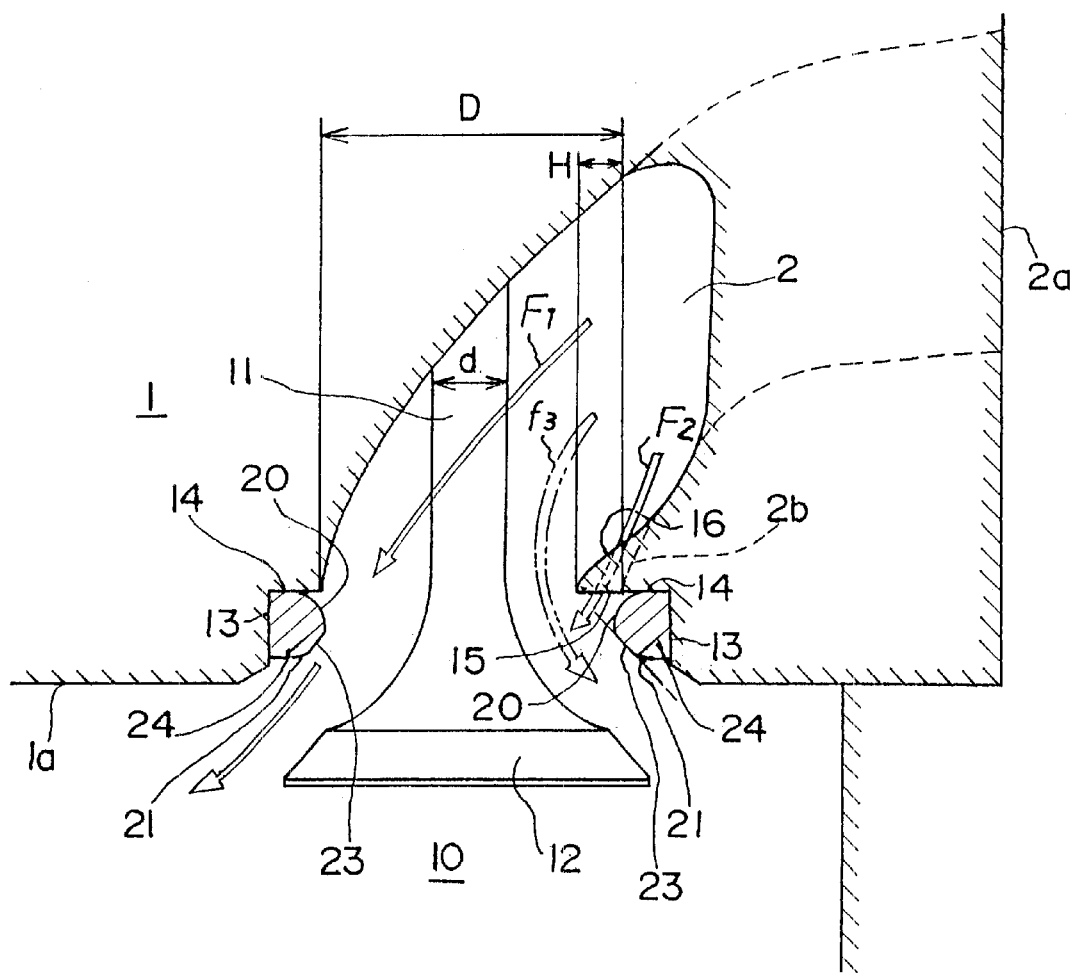
FIG. 5 is a vertical sectional view of a cylinder head of the internal combustion engine according to Claim 6 of the present invention.

FIG. 5 shows the embodiment according to the invention as claimed in Claim 6 of the present invention, and comprises a structure in which a rounded (R) valve seat 24 is installed for serving as the valve seat. The shape of the extending portion 15 may be anyone shown by FIG. 2, FIG. 6, FIG. 9, FIG. 10, FIG. 11 or FIG. 12. Other structures are the same with those of FIG. 1, and the same components and same parts are attached with the same symbols. The rounded valve seat 24 itself is well known, and rounded surfaces 20 and 21 are formed on axial both sides (upper and lower sides) of a conically worked seat surface 23.

By using such the rounded valve seat 24, the peeling-off of intake flow is reduced at a border between the bottom end of the seat surface 23 and the lower rounded surface 21. This effect is remarkable at a part where no extending portion is existing, and the counter swirl flow is relatively reduced. Thereby, the swirl flow is intensified further.

Industrial Applicability

According to the shape of intake portion of the present invention, the swirl flow can be intensified and the pressure loss can be reduced by making the intake uniform. Thereby, the intake port is suitable for various internal combustion engines wherein the swirl is produced using the direct port.

What is claimed is:

1. An intake port for a combustion chamber of an internal combustion engine comprising an annular stepped surface for supporting a valve seat formed on an intake port outlet portion of a cylinder head, a mounting surface of the cylinder head being in the same plane as an upper portion of the combustion chamber, and an end face of a valve seat contacting and supporting the annular stepped surface, an inner peripheral edge of the annular stepped surface includes an inner peripheral edge of the valve seat as its base circle, and has an extending portion projecting toward a valve stem side at a radial inlet side portion of the intake port, wherein the extending portion includes a top portion that has a face in the same plane as the annular step surface, and the extending portion is formed into a mountain-like shape which widens from its top portion projecting toward the valve stem side to both peripheral sides with moderate inclinations, and finally connects to the base circle at both foot ends, and a ridge-like back wall is formed at a side opposite to a valve seat side of the extending portions, the back wall decreasing its projecting height toward an upstream side along the intake port and connecting smoothly to an inner peripheral wall surface of the intake port, whereby a non-vertical swirl is formed in the combustion chamber.

2. An intake port for an internal combustion engine as claimed in claim 1, comprising a rounded valve seat.

3. An intake port for an internal combustion engine comprising an annular stepped surface for supporting a valve seat formed on an intake port outlet portion of a cylinder head, and an end face of a valve seat contacting and supporting the annular stepped surface, an inner peripheral edge of the annular stepped surface includes an inner peripheral edge of the valve seat as its base circle, and has an extending portion projecting toward a valve stem side at a radial inlet side portion of the intake port, and the extending portion is formed into a mountain-like shape which widens from its top portion projecting toward the valve stem side to both peripheral sides with moderate inclinations, and finally connects to the base circle at both foot ends, and a ridge-like back wall is formed at a side opposite to a valve seat side of the extending portions, the back wall decreasing its projecting height toward an upstream side along the intake port and connecting smoothly to an inner peripheral wall surface of the intake port.

4. An intake port for an internal combustion engine as claimed in claim 3, comprising a rounded valve seat.

5. An intake port for an internal combustion engine as claimed in claim 4, comprising a rounded valve seat.

6. An intake port for a combustion chamber of an internal combustion engine comprising an annular stepped surface for supporting a valve seat formed on an intake port outlet portion of a cylinder head, a mounting surface of the cylinder head being in the same plane as an upper portion of the combustion chamber, and an end face of a valve seat contacting and supporting the annular stepped surface, an inner peripheral edge of the annular stepped surface includes an inner peripheral edge of the valve seat as its base circle, and has an extending portion projecting toward a valve stem side at a radial inlet side portion of the intake port, wherein the extending portion includes a top portion that has a face in the same plane as the annular step surface, the extending portion is formed into a trapezoidal shape which has a flat top portion projecting toward the valve stem side, widens from the flat top portion to both peripheral sides with moderate inclinations, and finally connects to the base circle at both foot ends, and a ridge-like back wall is formed at a side opposite to the valve seat side of the extending portion, the back wall decreasing its projecting height toward an upstream side along an intake port and connecting smoothly to an inner peripheral wall surface of the intake port, whereby a non-vertical swirl is formed in the combustion chamber.

7. An intake port for an internal combustion engine as claimed in claim 6, comprising a partially circular concave portion on the top portion with a specified distance kept from the valve stem.

8. An intake port for an internal combustion engine as claimed in claim 6 comprising, a mountain-like top portion projecting toward the valve stem side formed at a peripheral central portion of the trapezoidal extending portion.

9. An intake port for a combustion chamber of an internal combustion engine comprising an annular stepped surface for supporting a valve seat formed on an intake port outlet portion of a cylinder head, a mounting surface of the cylinder head being in the same plane as an upper portion of the combustion chamber, and an end face of a valve seat contacts with and supports the annular stepped surface to support it, an inner peripheral edge of the annular stepped surface includes an inner peripheral edge of the valve seat as its base circle, and has an extending portion projecting toward a valve stem side at a radial inlet side portion of the intake port, wherein the extending portion includes a top portion that has a face in the same plane as the annular step surface the extending portion is formed into an arc-like shape with respect to the base circle, and a back wall is formed at a side opposite to a valve seat side of the extending portion, the back wall decreasing its projecting height toward an upstream side along the intake port and connecting smoothly to an inner peripheral wall surface of the intake port, whereby a non-vertical swirl is formed in the combustion chamber.

10. An intake port for an internal combustion engine as claimed in claim 9, comprising a partially circular concave portion on the top portion with a specified distance kept from the valve stem.

11. An intake port for an internal combustion engine as claimed in claim 9 comprising, a mountain-like top portion projecting toward the valve stem side formed at a peripheral central portion of the arc-like extending portion.

12. An intake port for an internal combustion engine comprising an annular stepped surface for supporting a valve seat formed on an intake port outlet portion of a cylinder head, and an end face of a valve seat contacting and supporting the annular stepped surface, an inner peripheral edge of the annular stepped surface includes an inner peripheral edge of the valve seat as its base circle, and has an extending portion projecting toward a valve stem side at a radial inlet side portion of the intake port, the extending portion is formed into a trapezoidal shape which has a flat top portion projecting toward the valve stem side, widens from the flat top portion to both peripheral sides with moderate inclinations, and finally connects to the base circle at both foot ends, and a ridge-like back wall is formed at a side opposite to the valve seat side of the extending portion, the back wall decreasing its projecting height toward an upstream side along an intake port and connecting smoothly to an inner peripheral wall surface of the intake port.

13. An intake port for an internal combustion engine as claimed in claim 12, comprising a rounded valve seat.

14. An intake port for an internal combustion engine as claimed in claim 12, comprising a partially circular concave portion on the top portion with a specified distance kept from the valve stem.

15. An intake port for an internal combustion engine as claimed in claim 14, comprising a rounded valve seat.

16. An intake port for an internal combustion engine as claimed in claim 12 comprising, a mountain-like top portion projecting toward the valve stem side formed at a peripheral central portion of the trapezoidal extending portion.

17. An intake port for an internal combustion engine as claimed in claim 16, comprising a rounded valve seat.

18. An intake port for an internal combustion engine comprising an annular stepped surface for supporting a valve seat formed on an intake port outlet portion of a cylinder head, and an end face of a valve seat contacts with and supports the annular stepped surface to support it, an inner peripheral edge of the annular stepped surface includes an inner peripheral edge of the valve seat as its base circle, and has an extending portion projecting toward a valve stem side at a radial inlet side portion of the intake port, the extending portion is formed into an arc-like shape with respect to the base circle, and a back wall is formed at a side opposite to a valve seat side of the extending portion, the back wall decreasing its projecting height toward an upstream side along the intake port and connecting smoothly to an inner peripheral wall surface of the intake port.

19. An intake port for an internal combustion engine as claimed in claim 18, comprising a rounded valve seat.

20. An intake port for an internal combustion engine as claimed in claim 18, comprising a partially circular concave portion on the top portion with a specified distance kept from the valve stem.

21. An intake port for an internal combustion engine as claimed in claim 20, comprising a rounded valve seat.

22. An intake port for an internal combustion engine as claimed in claim 18 comprising, a mountain-like top portion projecting toward the valve stem side formed at a peripheral central portion of the arc-like extending portion.

23. An intake port for an internal combustion engine as claimed in claim 22, comprising a rounded valve seat.

\* \* \* \* \*